United States Patent

Witmore

[15] 3,659,055

[45] Apr. 25, 1972

[54] PULSE SIGNAL REPEATER

[72] Inventor: Ronald Kirk Witmore, Boulder, Colo.

[73] Assignee: Bell Telephone Laboratories, Incorporated, Murray Hill, Berkeley Heights, N.J.

[22] Filed: Oct. 27, 1970

[21] Appl. No.: 84,338

[52] U.S. Cl. ..........................................179/16 E, 178/70 R

[51] Int. Cl. ..........................................H04b 3/36

[58] Field of Search ..............179/16 E, 16 EA, 16 EC, 16 F, 179/15 AD; 307/232, 247 R, 268, 273; 328/195; 178/70 A, 70 B, 70 C, 70 D, 70 F, 70 TS, 70 R; 325/13, 41

[56] References Cited

UNITED STATES PATENTS

| | | | |
|---|---|---|---|
| 3,452,220 | 6/1969 | Fritschi | 179/16 E |
| 3,436,479 | 4/1969 | Houcke et al. | 178/70 R |

*Primary Examiner*—Kathleen H. Claffy
*Assistant Examiner*—Randall P. Myers
*Attorney*—R. J. Guenther and James Warren Falk

[57] ABSTRACT

A pulse signal filter for repeating high-low input level dial pulses wherein an output flip-flop is settable into one of two stable states to apply to an output circuit a high or a low signal level according to the level of an input signal. Each input transition (low-to-high and high-to-low) is delayed for 12.5 ms, at which time the state of the flip-flop is changed provided the input level is then different from the output level. An input-output logic level comparator drives a single-shot timer into its astable timing state for 12.5 ms each time the input level changes so as to be different from the output level. Enable-disable gates are controlled by the timer to allow the flip-flop to be set according to the input level only when the timer is in its stable state. Changes of the input level are disregarded (i.e., filtered out) during the 12.5 ms timing interval. The single-shot timer is continuously recycled so as to become effective at all input transitions which occur at intervals longer than 12.5 ms.

12 Claims, 14 Drawing Figures

INVENTOR
R. K. WITMORE
BY
ATTORNEY

NAND GATE

INVERTER GATE

DELAYED NAND GATE

FLIP-FLOP

FLIP-FLOP

SINGLE-SHOT

PULSE SIGNAL REPEATER

BACKGROUND OF THE INVENTION

The general field of the present invention is pulse signaling wherein the signals consist of at least two logic levels and abrupt between-level transitions. In that general field, the present invention relates particularly to circuitry for receiving and for transmitting such pulse signals without any essential change in the character of the signals while disregarding unduly short signals, such as spurious or false transients.

Pulse signals, such as in the telephone transmission field, must conform to specified tolerances as to pulsing speed, duration of high and low level pulse intervals, and duty cycle, the latter more familiarly referred to as percent break (% BK). Telephone dial pulsing speed may be established nominally as, for instance, at 10 pulses per second (10 PPS) with an off-hook make interval of about 40 milliseconds (40ms MK) and an on-hook break interval of about 60 milliseconds (60ms BK), thus establishing a 60 % BK duty cycle.

Due to many well-known factors, any set of nominal pulse signal parameters may become altered even though it is desired to hold the parameters close to the nominal values. From time to time it is necessary to pass pulse signals through circuits which may be considered as falling into two main categories. One category repeats input pulses as output pulses with no essential change in character: such circuits are referred to herein as pulse repeaters. The other category, herein referred to as pulse correctors, provides output pulses in corrected form even though the input pulses may vary widely from the correct parameters.

The present invention is concerned primarily with the pulse repeater art wherein the prime purpose of the repeater circuitry is to provide output pulses in response to input pulses and to provide output pulses whose parameters are essentially the same as those of the input pulses. However, in this pulse repeater area it is necessary in some instances for the repeater to disregard input pulsing which falls short of allowable tolerances. For instance, a legitimate on-hook to off-hook to on-hook signal interval (the duration of an off-hook make interval) may be considered as spurious or false, or accidental, etc., if it does not persist for a specified time, such as 12.5ms. The same might apply to an on-hook interval.

The transitions which occur during pulse signaling, such as the change from make to break or vice versa, are sometimes accompanied by so-called chatter or bounce transients. It is desirable in pulse repeaters, as well as in pulse correctors, to mask or filter out such transients.

The above instances of unduly short pulses and of undesirable chatter and bounce transitions have been dealt with by timing arrangements which (1) recognize an input logic level transition, (2) provide a time interval, such as 12.5ms, during which further changes in the input logic level are disregarded, and (3) allow the input logic level transition to be repeated as an output logic level transition at the end of the time interval only if the input change then persists.

The prior art includes many attempts to provide such timing or masking or filtering arrangements in pulsing circuitry such as repeaters and pulse correctors. Some such timing arrangements use one timer for one type of transition, such as break (BK)-to-make (MK), but do not operate on the other type of transition, such as MK-to-BK: these arrangements fail to take into account undesirable transients at the other type of transition. Other arrangements provide a separate timer for each separate type of transition: these arrangements are subject to two possible variables in the two timers such that the actual time durations pertinent to the different transitions may not be the same, thus causing failure to repeat all transitions with the same amount of delay and causing changes in one or more parameters of the pulsing. Some arrangements use a single timing device for all transitions but the time duration is affected by the nature and amount of input fluctuations or transients: these inject undesirable time delay variations and parameter changes from transition to transition.

The above deficiencies of the prior art are eliminated by the present invention: a pulse repeater is provided wherein a single timing circuit provides a single fixed masking or filtering delay time for each transition so that each input transition (from one logic level to another) is repeated as an output transition (a comparable change in logic level) after a fixed and constant delay time provided the input level is different from the output level at the end of the time interval. During the delay time interval, fluctuations of the input logic level are disregarded; i.e., they are masked or filtered out.

SUMMARY OF THE INVENTION

The present invention contemplates a pulse repeater for receiving and for transmitting pulse signals consisting of at least two logic levels and abrupt between-level transitions. The repeater comprises an input circuit for receiving input pulse signals, an output circuit for transmitting output pulse signals, an input-output comparator for comparing the logic level signal conditions on the input and output, a timing circuit controlled by the comparator for providing a disable signal for a prescribed time upon the occurrence of an input transition changing the input level from the same as to different from the output level and for providing an enable signal prior to and subsequent to the prescribed time, a two-state output device settable from one state to the other to establish on the output circuit corresponding different signal logic levels, and an enable-disable gate circuit controlled by the timing circuit to be enabled by an enable signal and disabled by a disable signal, the gate circuit also controlled by the comparator to set the output device in the same state as the input only when the gate circuit is enabled.

In particular aspect, the invention contemplates an output device which has two control terminals selectively energizable to determine the state of the device, a separate enable-disable gate for each terminal, and a single-shot analog timer for controlling both gates. Upon the occurrence of an input transition which makes the input level different from the output level, the comparator drives the single-shot into its astable timing state, during which time interval the gates are disabled. At the end of the time interval, when the single-shot returns to its stable state, the gates are enabled so that the terminals of the output device can be energized according to the then existing signal logic levels of the input and output.

Specifically, the output device of the invention is a flip-flop having two control terminals selectively energizable to set the flip-flop into one of two stable states so as to apply to the output circuit one of two corresponding signal logic levels: the single-shot timer allows input signal transitions to be repeated at the output only if the input logic level is different from the output logic level at the end of the disabling time interval.

BRIEF DESCRIPTION OF THE DRAWING

The drawing consists of FIGS. 1 through 14 arranged on five sheets as follows.

DETAILED DESCRIPTION

The detailed description of the exemplary embodiment is arranged in three main parts: the *Circuit Symbols;* the *Block Diagram;* and, the *Detailed Circuit Disclosure*. These parts will be dealt with in the above order under the indicated headings.

CIRCUIT SYMBOLS

Figure 2:
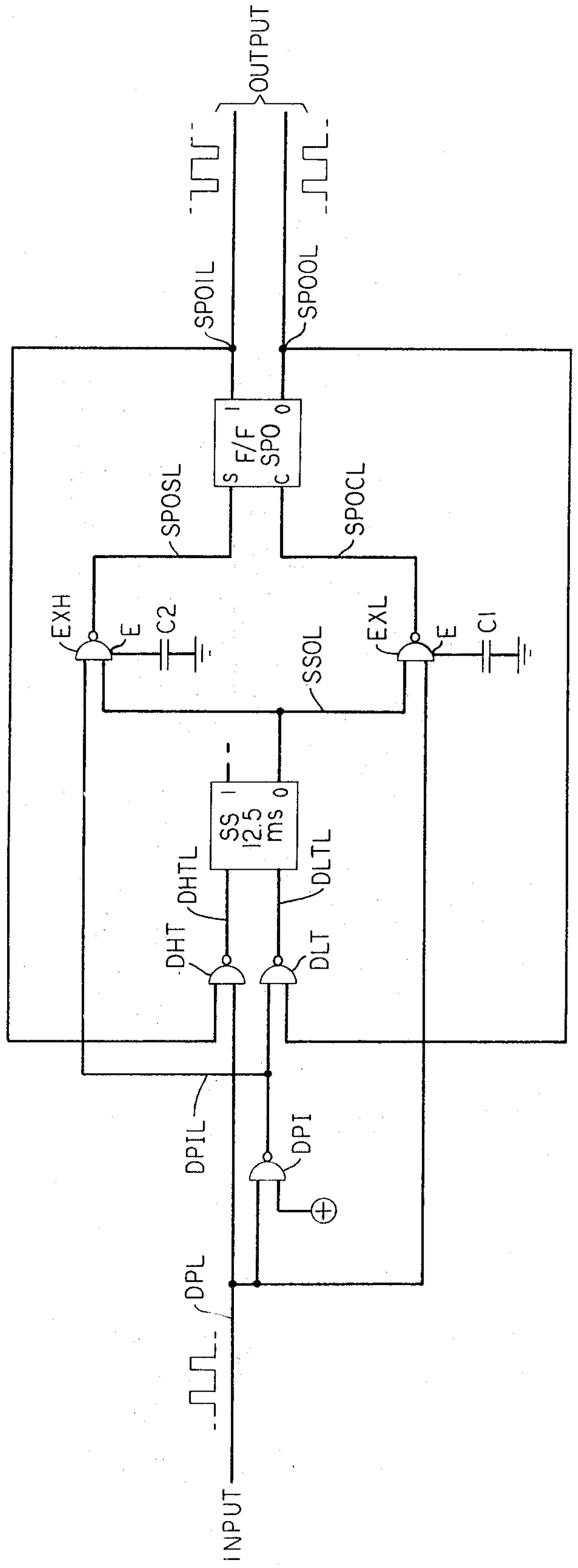

The following, under suitable headings, explain conventions and symbols as used in the detailed circuit of FIG. 2. In explaining the action of the circuit components, it is assumed that they are connected in the circuit as shown in FIG. 2. The diagrams used to show the action of the components are not intended to represent true waveforms, but merely to illustrate the logic level functions performed by the circuit components in the context of FIG. 2.

Battery and Ground

A circle with a plus sign(+) indicates the positive terminal of a source of direct current supply, the negative terminal of which is assumed to be connected to ground, which is considered as zero potential. The direct current voltage is assumed to be plus 4.5 volts unless otherwise indicated.

High and Low Signals

A potential condition, whether steady or transient, is said to be a high logic level if it is 3.5 volts or more positive. A low logic level condition is a voltage not more positive than about 1.5 volts—nominally zero, or ground.

DTL Logic Components

The gates, etc., used involve Diode-Transistor-Logic components, more familiarly referred to as DTL logic. The NAND gate components shown in FIGS. 4, 6, 8, 10, and 11 may be implemented from Western Electric Company 1AG type devices. The single-shot component shown in FIG. 13 may be implemented from a Western Electric Company 1AD type device.

NAND Gate

Figure 4:
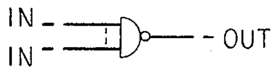

FIG. 4 shows the symbol for a typical multiple-input NAND gate.

Figure 5:
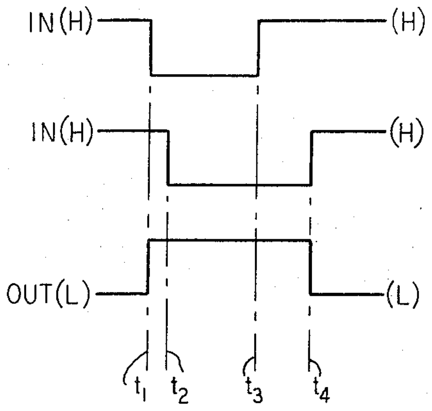

FIG. 5 shows the circuit action of the NAND gate. The output will be low only if all inputs are high, such as prior to time $t_1$ and after time $t_4$. Otherwise, the output will be high, such as from time $t_1$ to time $t_4$.

Inverter Gate

Figure 6:
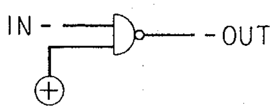

FIG. 6 shows the symbol for a typical inverter gate consisting of a two-input NAND gate one of whose inputs is permanently high by being connected to plus 4.5 volts.

Figure 7:
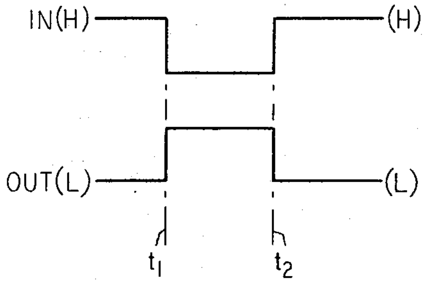

FIG. 7 shows the circuit action of the inverter gate. The output will be the inverse of the input. That is, a low input from time $t_1$ to time $t_2$ produces a high output; whereas, prior to time $t_1$ and after $t_2$, the high input produces a low output.

Delayed NAND Gate

Figure 8:
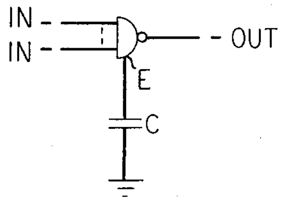
Figure 9:
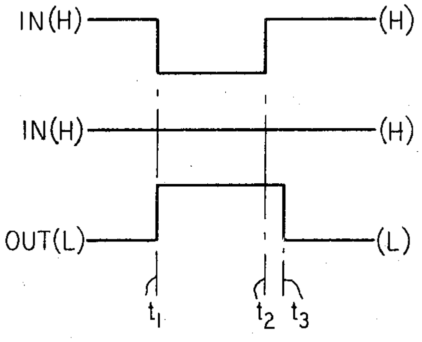

FIG. 8 shows the symbol for a typical NAND gate with its "expander" lead E connected to ground through capacitor C. This symbol represents a multiple-input NAND gate wherein, as shown in FIG. 9, any high-to-low output transition is delayed for a prescribed time, such as from time $t_2$ to time $t_3$, depending primarily upon the value of the capacitor C. There is no appreciable delay to speak of associated with a low-to-high output transition, such as at time $t_1$. A typical delay of about 1 microsecond is used in the circuit of FIG. 2 regarding the delayed NAND gates.

Flip-Flop

Figure 10:
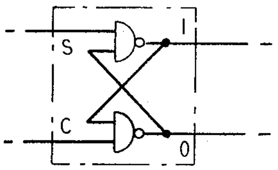
Figure 11:
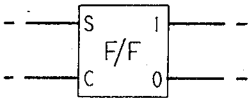

FIG. 10 shows how two, two-input NAND gates may be cross-connected to produce a flip-flop, the symbol for which is shown in FIG. 11.

Figure 12:
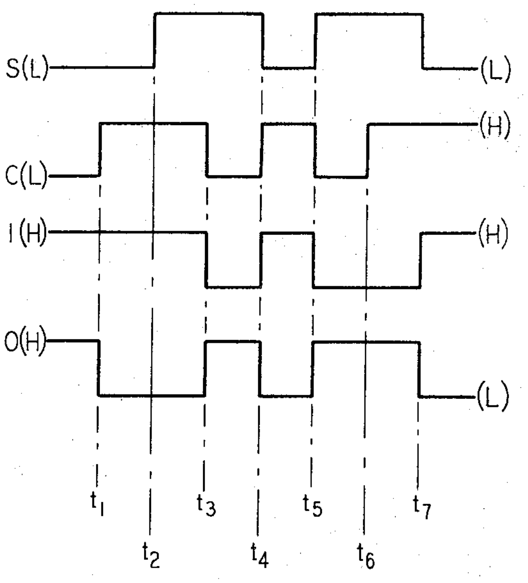

FIG. 12 illustrates the various logic levels or level changes which exist or occur on the 1 and 0 output leads upon various level conditions or changes on the S and C input leads. If leads S and C are both low (prior to time $t_1$), then both output leads 1 and 0 will be high. If lead S is low and lead C is high (times $t_1$–$t_2$, $t_4$–$t_5$, and after $t_7$), then lead 1 will be high and lead 0 will be low: if lead S then becomes high with lead C remaining high (time $t_2$), the output condition does not change. If lead S is high and lead C is low (times $t_3$–$t_4$ and $t_5$–$t_6$), then lead 1 will be low and lead 0 will be high: if lead C then becomes high with lead S remaining high (time $t_6$), the output condition does not change. If both inputs S and C are low and are both changed to high at the same time, one of the outputs 1 and 0 will be low with the other one high, with an uncertainty as to which is which.

Single-Shot

Figure 14:
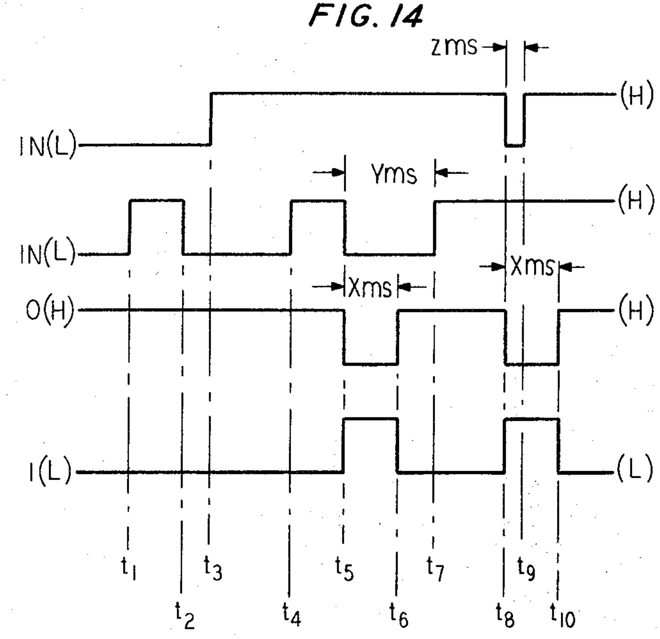
Figure 13:
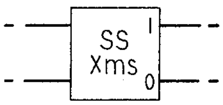

FIG. 13 shows the symbol for a two-input, two-output single-shot timing device. The device is arranged, as illustrated in FIG. 14, so that as long as at least one of the two inputs is and has been low for at least $x$ms, the 0 output will be high and the 1 output will be low, and no change of the other input level will affect that output condition. Whenever both inputs are high, a change of either one from high to low will cause the 0 and 1 outputs to change to respective low and high levels, to remain there for $x$ milliseconds ($x$ms), and then to revert to respective high and low levels. One such transition occurs at time $t_5$ when one input goes low for $y$ms with the other input remaining high: time interval $t_5$ to $t_6$ is the interval of $x$ms during which the single-shot provides an $x$ms low pulse on output lead 0 and an $x$ms high pulse on output lead 1. Another such transition occurs at time $t_8$ when one input goes low for $z$ms with the other input remaining high: again, time interval $t_8$ to $t_{10}$ is the interval of $x$ms during which the single-shot provides an $x$ms low on output lead 0 and an $x$ms high pulse on output lead 1. The single-shot is arranged, as is well known, so that as long as the circuit is in its astable timing interval, changes on the inputs have no effect. The circuit is not responsive to input changes until output 1 has returned to low and output 0 has returned to high, both occurring at the end of the timing interval.

BLOCK DIAGRAM

Figure 1:
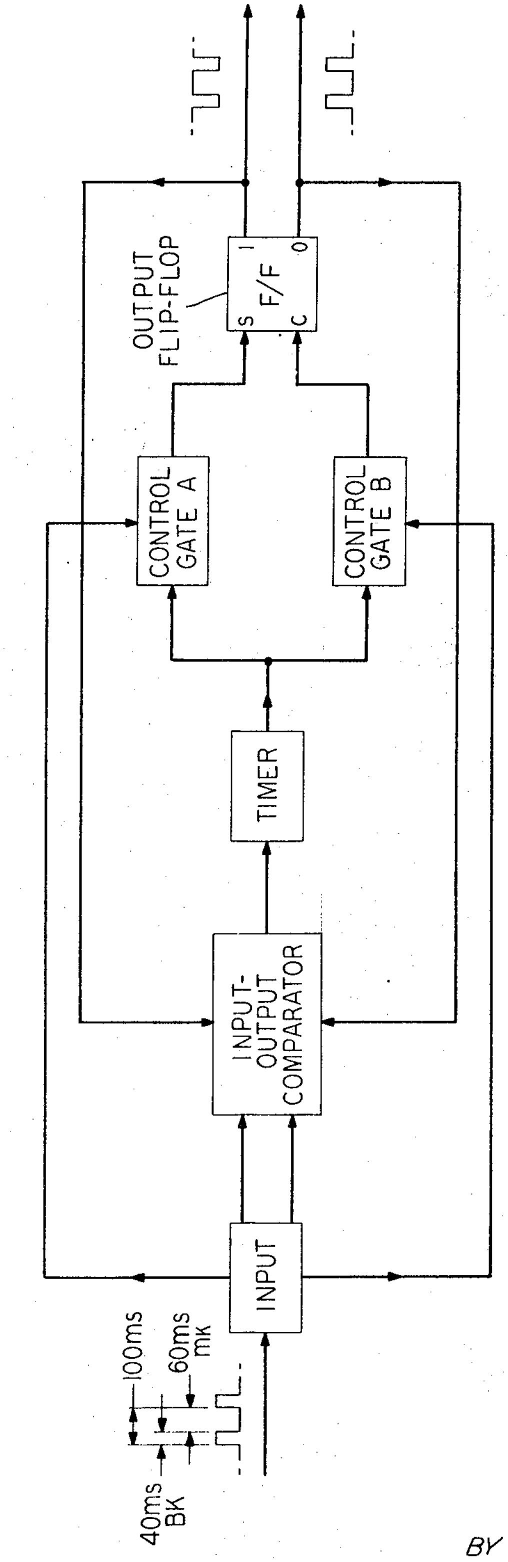
FIG. 1 is a block diagram showing the main functional parts of the detailed circuit disclosure of FIG. 2.

In FIG. 1, the input circuit is supplied with pulse signals consisting of low (lower) and high (upper) logic levels and signal transitions from one level to the other. A typical pulse signal might be well-known telephone dial pulsing where the pulsing rate is about 10 pulses per seconds (pps) to provide a 100 millisecond (ms) pulse period, a 40ms break (BK) or on-hook interval and a 60ms make (MK) or off-hook interval. With such an input situation, the output flip-flop will provide on its output 0 a replica of the input and on its output 1 an inverse replica of the input. However, each output transition will be delayed a time interval (such as 12.5ms) from the corresponding input transition.

The timer normally applies to control gates A and B enabling potential so that these gates can selectively energize the S and C inputs to the flip-flop according to the input signal logic level. At certain times, to be explained below, the timer will disable control gates A and B for 12.5ms, during which timing interval or time duration the control gates A and B will be unable to change the logic levels at the flip-flop S and C inputs. At the end of the 12.5ms time, the timer will again enable control gates A and B to control the flip-flop according to the then-existing signal input condition.

The input-output comparator monitors the input signal level and the output signal level so as to control the timer responsive to an input level change which makes the input different from the output. Thus, each time an input transition occurs which represents an input level change rendering the input different from the output, the timer is controlled to measure the 12.5ms time interval during which the output is not affected by an input change. At the end of the 12.5ms time interval, when the control gates A and B are enabled, the output flip-flop will be controlled by the then-existing input condition; that is, the output will change if the input is then in a changed (with respect to what it was prior to the start of the 12.5ms interval) condition and the output will not change if the input is then unchanged (with respect to what it was prior to the start of the 12.5ms interval).

The 12.5ms time interval determined by the timer causes input changes lasting less than 12.5ms to be disregarded by the output and allows the output to repeat at the output after delays of 12.5ms all input changes lasting more than 12.5ms. The 12.5ms interval masks such short input conditions as the well-known chatter, rebound, and split pulse. The single timer advantageously functions at all input transitions, thus rendering more consistent the 12.5ms delay time for all transitions at the output.

Figure 3:
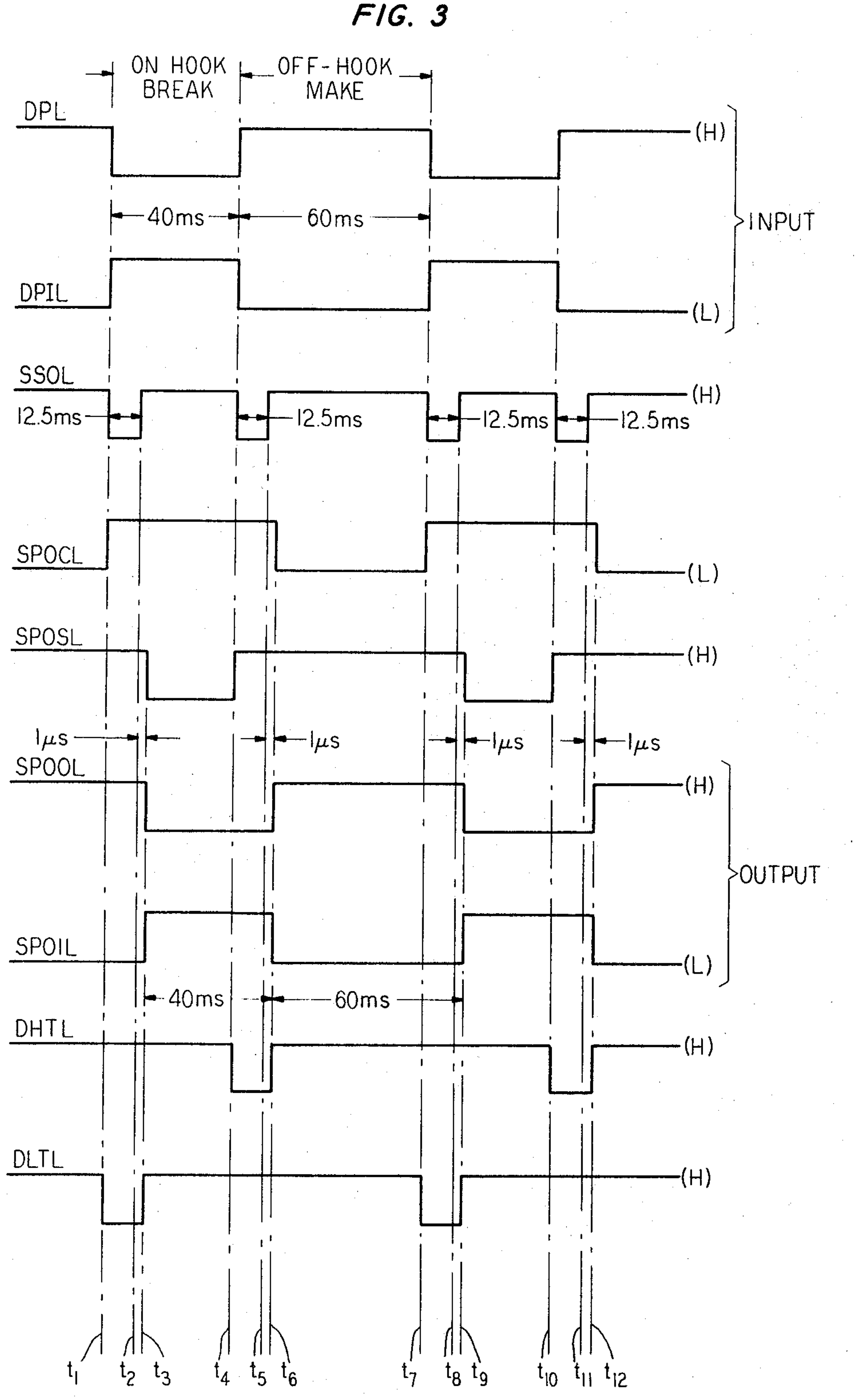
FIG. 3 is a timing chart illustrating logic level changes on particular leads of FIG. 2 in response to pulse signal input; and, FIGS. 4 through 14 show in symbolic form various well-known circuit components, and their logic level characteristics, as used in FIG. 2.

FIG. 3 shows a pulse timing diagram particularly related to the detailed circuit of FIG. 2 but useful in understanding the above-described block diagram of FIG. 1. The uppermost curve (labeled DPL) shows a typical pulse signal input. This input is repeated by the input circuit, along with its inverse (curve DPIL in FIG. 3) to the control gates A and B and to the input-output comparator. The curve SSOL in FIG. 3 represents the condition of the timer, the interval 12.5ms representing the time during which gates A and B are disabled, the other times representing intervals during which gates A and B are enabled. Curves SPOOL and SPOIL show the changes on the flip-flop outputs 0 and 1 as being replicas of the input DPL and its inverse DPIL delayed 12.5ms from the corresponding input. The one microsecond interval $1\mu s$ will be explained in connection with the description of FIG. 2.

DETAILED CIRCUIT DISCLOSURE

The detailed circuit disclosure of FIG. 2 will be described with respect to an input pulse signal involving the general characteristics shown in curve DPL of FIG. 3. In FIG. 2, the input lead DPL is assumed to be connected to a circuit supplying telephone dial pulse signals where an off-hook make interval is high and an on-hook break interval is low.

Steady State On-Hook

Prior to time $t_1$ in FIG. 3, it is assumed that a steady off-hook condition prevails with input lead DPL being high. The high on lead DPL is inverted by gate DPI to a low on lead DPIL. The output 0 of single-shot SS will be high (normal steady state condition) on lead SSOL. This high on lead SSOL at the upper input to gate EXL and at the lower input to gate EXH enables gates EXL and EXH to be controlled by their other inputs. The low on lead DPIL at the upper input of gate EXH will cause the output of gate EXH to be high on lead SPOSL at the S input to flip-flop SPO. Since the two inputs to gate EXL are high, the output of gate EXL will be low on lead SPOCL at the C input to flip-flop SPO. With inputs S and C of flip-flop SPO being respectively high and low, flip-flop SPO will be in a reset condition with its outputs 1 and 0 being respectively low and high on respective output leads SPOIL and SPOOL. The low on lead SPOIL at the upper input to gate DHT causes the output of gate DHT to be high on lead DHTL at the upper input to single-shot SS. The low on lead DPIL at the upper input to gate DLT causes the output of gate DLT to be high on lead DLTL at the lower input to single-shot SS. Also, the lower input to gate DLT is high from the high on lead SPOOL from the 0 output of flip-flop SPO, the lower input to gate EXH is high from the high output of the single-shot SS on lead SSOL, and the lower input to gate DHT is high from the high input on lead DPL.

Under the above steady high off-hook condition on input lead DPL, the output leads SPOOL and SPOIL are respectively high and low to provide a respective replica and inverse replica of the high input.

First High-to-Low Transition

In FIG. 3 it is assumed that the input on lead DPL in FIG. 2 goes from high to low at time $t_1$ at the start of the first break interval, which it is assumed will last for 40ms from time $t_1$ to time $t_4$. The high-to-low transition on lead DPL at the upper input to gate DPI causes a low-to-high transition at the output of gate DPI on lead DPIL. The high level on lead DPIL will also last for 40ms from time $t_1$ to time $t_4$. The low-to-high transition on lead DPIL at the upper input to gate DLT will cause a high-to-low transition at the output of gate DLT on lead DLTL at the lower input to single-shot SS. The high-to-low transition on lead DPL at the lower input to gate DHT does not affect the output of gate DHT, which remains high on lead DHTL at the upper input to single-shot SS. The high-to-low transition on lead DPL at the lower input to gate EXL causes a low-to-high transition at the output of gate EXL on lead SPOCL at the C input to flip-flop SPO: this will not alter the output state of flip-flop SPO (see time $t_6$ in FIG. 12).

The low-to-high transition on lead DPIL at the upper input to gate EXH will tend to cause the output of gate EXH to go from high to low; but, such a high-to-low transition at the output of this delayed NAND gate EXH will be delayed about $1\mu s$ (see FIG. 9). In the meantime, the high-to-low transition on lead DLTL at the lower input to single-shot SS, with its upper input held high on lead DHTL, will cause the output of single-shot SS to carry a high-to-low transition (see FIG. 14) on lead SSOL at the lower input to gate EXH and at the upper input to gate EXL. This low on lead SSOL will last for 12.5ms, at which time the output of single-shot SS will revert to high. The 12.5ms low on the lower input to gate EXH will disable gate EXH by holding its output high on lead SPOSL so that the $1\mu s$ delayed effect of gate EXH will not affect its output.

The prevailing situation is between times $t_1$ and $t_2$ of FIG. 3 with input lead DPL low during the first break interval and with the output flip-flop SPO still in a reset condition (output lead SPOIL low and output lead SPOOL high) representing a continuing make interval at the output.

End of Single-Shot Timing

The next significant action of the circuit takes place at time $t_2$ in FIG. 3 when the single-shot SS ends its 12.5ms timing to revert its output lead SSOL to a high condition. When this occurs, the upper input to gate EXL and the lower input to gate EXH experience low-to-high transitions: this allows gates EXL and EXH to be controlled by their other inputs. The high output of gate EXL will not change since its lower input is held low on lead DPL. However, when the lower input to gate EXH goes high on lead SSOL, with its upper input held high on lead DPIL, the output of gate EXH will tend to go low on lead SPOSL at the S input to flip-flop SPO. As explained previously (see FIG. 9), the high-to-low transition on lead SPOSL will be delayed $1\mu s$ until time $t_3$, whereupon lead SPOSL goes low.

When input S of flip-flop SPO goes low on lead SPOSL at time $t_3$, with input C of flip-flop SPO held high on lead SPOCL, the flip-flop SPO will be changed over to a set condition (output 1 goes from low to high and output 0 goes from high to low). This change of state of the output flip-flop SPO provides a make-to-break transition on leads SPOIL and SPOOL: lead SPOIL will go from low to high and lead SPOOL will go from high to low. Thus, the input make-to-break transition at time $t_1$ has been repeated at the the output 12.501ms later (the 12.5ms timing of single-shot SS plus the $1\mu s$ delay in gate EXH).

The high-to-low transition on lead SPOOL at the lower input to gate DLT causes the output of gate DLT to go high on lead DLTL at the lower input to single-shot SS, which does not affect the output of single-shot SS (see FIG. 14). The low-to-high transition on lead SPOIL at the upper input to gate DHT does not change the high output of gate DHT. As a result of these operations, the two inputs to single-shot SS are again made high to await another high-to-low transition for timing purposes.

The circuit stays in the above condition from time $t_3$ to time $t_4$ when the end of the first low break interval on input lead DPL will occur.

First Low-to-High Transition

At time $t_4$ in FIG. 3 occurs a low-to-high transition of the input on lead DPL to mark the end of the first 40ms low break interval. Lead DPL will thereupon go from low to high and will remain high during the 60ms make interval until time $t_7$ at the upper input to gate DPI and at the lower inputs to gates DHT and EXL. Likewise, lead DPIL at the output of gate DPI, and at the upper inputs to gates EXH and DLT will go from high to low and will remain low until time $t_7$. The high-to-low transition on lead DPIL at the upper input to gate EXH causes the output of gate EXH to go from low to high on lead SPOSL at the S input to flip-flop SPO: this does not change the state of flip-flop SPO since its input C is still high (see FIG. 12). The low-to-high transition on lead DPL at the lower input to gate EXL will tend to cause the output of gate EXL on lead SPOCL to go from high to low: but, the delay characteristic of gate EXL (see FIG. 9) will delay such a high-to-low output change for 1$\mu$s. In the meantime, the low-to-high transition on lead DPL at the lower input to gate DHT (upper input still high on lead SPOIL) will produce at the output of gate DHT a high-to-low transion on lead DHTL at the upper input to single-shot SS: the lower input to single-shot SS remains high with both of the inputs to gate DLT now low.

The high-to-low transition on lead DHTL at the upper input to single-shot SS causes output 0 of single-shot SS to experience a high-to-low transition on lead SSOL: the low on lead SSOL at the lower input to gate EXH and at the upper input to gate EXL will last for 12.5ms (to time $t_5$ in FIG. 3), at which time lead SSOL will revert to high. Since any high-to-low change at the output of gate EXL is delayed for 1$\mu$s, the 12.5ms low at the upper input to gate EXL will hold high the output of gate EXL on lead SPOCL at the C input to flip-flop SPO.

The circuit remains in the above condition until the end of the 12.5ms timing of single-shot SS at time $t_5$ in FIG. 3. The input on lead DPL has changed from the low break to the high make; but, the state of flip-flop SPO has not changed from its set condition, with output 0 on lead SPOOL being low and output 1 being high on lead SPOIL, representing a continuing break output logic level.

End of Single-Shot Timing

At time $t_5$ in FIG. 3, when single-shot SS ends its 12.5ms timing interval, the output of single-shot SS on lead SSOL changes from low to high. The output of gate EXH remains high on lead SPOSL at the S input to flip-flop SPO. The output of gate EXL, on lead SPOCL at the C input to flip-flop SPO, experiences a high-to-low transition after a 1$\mu$s delay (see FIG. 9). Thus 1$\mu$s after the end of the 12.5ms timing interval of single-shot SS, the C input to flip-flop SPO is made low with its S input remaining high: this resets flip-flop SPO, with its 1 output going from high to low on lead SPOIL and its 0 output going from low to high on lead SPOOL, to provide to the output leads SPOIL and SPOOL the low-to-high transition from break to make intervals. This output change occurs at time $t_6$, which is 12.501ms after the corresponding input change at time $t_4$.

When the 1 output of flip-flop SPO goes low on lead SPOIL at time $t_6$, the upper input to gate DHT also goes low to cause the output of gate DHT to go from low to high on lead DHTL at the upper input to single-shot SS: this does not affect the existing high output of single-shot SS on lead SSOL. The high on output lead SPOOL at the lower input to gate DLT does not alter the existing high output of gate DLT on lead DLTL at the lower input to single-shot SS. The two inputs to single-shot SS are thus both returned to high on leads DHTL and DLTL to prepare single-shot SS to accept a high-to-low transition on either of its inputs for starting another 12.5ms timing interval.

Thus, the low-to-high break-to-make input transition on lead DPL at time $t_4$ (see FIG. 3) has been repeated on the output leads SPOIL and SPOOL 12.501ms later at time $t_6$. The circuit remains in this condition from time $t_6$ to time $t_7$ when the next high-to-low make-to-break input transition occurs on lead DPL.

Subsequent Transitions

In the light of the above detailed description, it will be apparent that ensuing input pulse signals will be repeated as output pulses with the transitions delayed 12.501ms each. This assumes, of course, that each pulse logic level lasts longer than the 12.5ms timing of the single-shot SS: otherwise, it will not be repeated at the output.

Short Input Pulse

With the circuit in the condition existing between times $t_6$ and $t_7$ of FIG. 3, let it be assumed that a high-to-low make-to-break transition occurs on input lead DPL in FIG. 2 sometime after time $t_6$, stays low for 8ms and returns to high before time $t_7$. This represents a false short pulse, such as some inadvertent transient. The high-to-low transition on lead DPL will produce a low-to-high transition on lead DPIL and a high-to-low transition on lead DLTL at the lower input to single-shot SS. The single-shot SS will start its 12.5ms timing interval in response to the high-to-low transition at its lower input: the timing interval, as previously noted, consists of a 12.5ms low at the output of single-shot SS on lead SSOL. The output of gate EXL will go from low to high on lead SPOCL at the C input to flip-flop SPO due to the 8ms low on lead DPL at the lower input to gate EXL (and the 12.5ms low on lead SSOL at the upper input to gate EXL): the condition of flip-flop SPO is not changed due to this low-to-high transition at its C input. The upper input to single-shot SS remains high on lead DHTL since both inputs to gate DHT are low. The output of gate EXH remains high on lead SPOSL at input S to flip-flop SPO due to the 12.5ms low on lead SSOL. The tendency for the output of gate EXH to go from high to low on lead SPOSL due to the 8ms high on lead DPIL is delayed (see FIG. 9) for 1$\mu$s so that the 12.5ms low on lead SSOL can disable gate EXH. The output of flip-flop SPO remains in a high make condition (reset) with lead SPOIL low and lead SPOOL high.

When the input returns to high on lead DPL at the end of the assumed 8ms short pulse, all parts of the circuit return to the condition existing before the occurrence of the 8ms short input pulse except that the output of single-shot SS is still low (it will last for 4.5ms longer) and except that the output of gate EXL will remain high for the remainder of the 12.5ms interval. At the end of the 12.5ms timing of single shot SS, lead SSOL will return from low to high: this causes the output of gate EXL to return from high to low on lead SPOCL at the C input to flip-flop SPO. The S input to flip-flop SPO remains high, so flip-flop SPO remains in the reset condition (lead SPOIL low and lead SPOOL high). In other words, the short 8ms input pulse on lead DPL has not been repeated at the output since the input and the output are in the same condition at the end of the 12.5ms timing interval.

The same circuit operation takes place on short input pulses initiated by a low-to-high transition, such that an input change in either logic direction will be repeated at the output only if the input and output are in different logic states at the end of the 12.5ms timing interval.

Input Chatter

It will be appreciated from previous description, particularly regarding the nature of the single-shot SS (see FIGS. 13 and 14), that a series of very short transitions on input lead DPL, such as the "chatter" or "bounce" conditions sometimes found on pulsing leads, will be masked by the 12.5ms timing interval of single-shot SS so as not to affect the state of the output flip-flop SPO. Once the single-shot SS is driven into its 12.5ms astable timing interval, the single-shot is no longer responsive to input changes until the end of the 12.5ms timing. Thus, chatter, rebound, etc., which cause short multiple input transients will be masked or covered up by the single-shot timing. At the end of the 12.5ms timing interval, the output will be compared to the input by means primarily of gates EXH and EXL: and, the state of the output flip-flop SPO will be changed only if it is then different from the input logic state.

It is understood that the above-described arrangement is illustrative of the application of the principles of the invention. Other arrangements may be devised by those skilled in the art without departing from the spirit and scope of the invention. For instance, other types of signaling may be employed, besides the exemplary high-low level signaling, such as on-off tone pulsing, multilevel tone or voltage pulsing, and the like. Also, many different timing circuits will be understood as useful in lieu of the disclosed single-shot circuit. In addition, there may be output devices other than the exemplary flip-flop and which could be used for the purposes set forth.

What is claimed is:

1. A pulse repeater for receiving and for transmitting pulse signals consisting of two logic levels of signal and abrupt between-level signal transitions comprising A. an input circuit for receiving pulse signals;

B. a two-state output device settable into either state and from either state to the other state;

C. an output circuit controlled by the output device to transmit pulse signals consisting of 1. two logic levels of signal corresponding to the two states of the output device
2. and abrupt between-level signal transitions corresponding to the setting of the output device from either state to the other state;

D. an enable-disable control gate circuit;
E. means interconnecting the control gate circuit with the input circuit and with the output device
1. so that the output device is set according to the input signal logic level whenever the control gate circuit is enabled
2. and so that the output device is prevented from being set according to the input signal logic level whenever the control gate circuit is disabled;

F. means for comparing the input signal with the output signal;
G. and, a time measuring circuit energizable to measure a prescribed time duration;
H. the control gate circuit controlled by the measuring circuit
1. so that the control gate circuit is disabled during the prescribed time duration
2. and so that the control gate circuit is enabled at all other times;

I. the measuring circuit controlled by the comparing means to be energized upon the occurrence of an input transition which changes the input logic level from the same as to different from the output logic level.

2. A pulse repeater for receiving and for transmitting pulse signals consisting of two logic levels of signal and abrupt between-level signal transitions comprising A. an input circuit for receiving pulse signals;
B. a two-state output device settable into either state and from either state to the other state;
C. an output circuit controlled by the output device to transmit pulse signals consisting of
1. two logic levels of signal corresponding to the two states of the output device
2. and abrupt between-level signal transitions corresponding to the setting of the output device from either state to the other state;

D. an enable-disable control gate circuit;
E. means interconnecting the control gate circuit with the input circuit and with the output device
1. so that the output device is set according to the input signal logic level whenever the control gate circuit is enabled
2. and so that the output device is prevented from being set according to the input signal logic level whenever the control gate circuit is disabled;

F. means for comparing the input signal with the output signal;
G. and, an energizable timer
1. effective when energized to provide a disabling signal for a prescribed time duration
2. and effective at all other times to provide an enabling signal;

H. the timer interconnected with the control gate circuit
1. so that the control gate circuit is disabled by the disabling signal
2. and so that the control gate circuit is enabled by the enabling signal;

I. the timer controlled by the comparing means to be energized upon the occurrence of an input transition which changes the input logic level from the same as to different from the output logic level.

3. A pulse repeater for receiving and for transmitting pulse signals consisting of two logic levels of signal and abrupt between-level signal transitions comprising A. an input circuit for receiving pulse signals;
B. a two-state output device settable into either state and from either state to the other state;
C. an output circuit controlled by the output device to transmit pulse signals consisting of
1. two logic levels of signal corresponding to the two states of the output device
2. and abrupt between-level signal transitions corresponding to the setting of the output device from either state to the other state;

D. an enable-disable control gate circuit;
E. means interconnecting the control gate circuit with the input circuit and with the output device
1. so that the output device is set according to the input signal logic level whenever the control gate circuit is enabled
2. and so that the output device is prevented from being set according to the input signal logic level whenever the control gate circuit is disabled;

F. means for comparing the input signal with the output signal;
G. and, an astable timing circuit
1. having a stable state and an astable state,
2. controllable to change from the stable state to the astable state,
3. self-controlled to remain in the astable state for a prescribed time duration,
4. and self-controlled to change from the astable state to the stable state at the end of the prescribed time duration;

H. the timing circuit interconnected with the control gate circuit
1. so that the control gate circuit is disabled whenever the timing circuit is in the astable state
2. and so that the control gate circuit is enabled whenever the timing circuit is in the stable state;

I. the timing circuit controlled by the comparing means to change from the stable state to the astable state upon the occurrence of an input transition which changes the input logic level from the same as to different from the output logic level.

4. A pulse repeater for receiving and for transmitting pulse signals consisting of two logic levels of signal and abrupt between-level signal transitions comprising A. an input circuit for receiving pulse signals;
B. an output device having
1. two stable states
2. and two input terminals selectively energizable to set the output device into a selected one of the two states and to switch the output device from either state to the other state;

C. an output circuit controlled by the output device to transmit pulse signals consisting of
1. two logic levels of signals corresponding to the two states of the output device
2. and abrupt between-level signal transitions corresponding to the switching of the output device from either state to the other state;

D. a separate enable-disable control gate connected to each input terminal of the output device;
E. means interconnecting the input circuit with the control gates so that
1. the input terminals of the output device are selectively energized according to the input signal logic level whenever the control gates are enabled
2. and the input terminals of the output device are prevented from being selectively energized according to the input signal logic level whenever the control gates are disabled;

F. means for comparing the input signal with the output signal;
G. and, timing means controlled by the comparing means
1. to disable the control gates for a prescribed time duration starting upon the occurrence of an input transition which changes the input logic level from the same as to different from the output logic level
2. and to enable the control gates at the end of the prescribed time duration.

5. The invention defined in claim 4 wherein

A. the timing means comprises a timer energizable to measure the prescribed time duration;
B. the comparing means energizes the timer upon the occurrence of a said input transition;
C. the timer disables the control gates during the measurement of the prescribed time duration;
D. and, the timer enables the control gates at the end of the measurement of the prescribed time duration.

6. The invention defined in claim 5 wherein
A. the timer comprises a monostable analog timer
1. having a stable non-timing interval
2. and energizable into an astable timing interval equal to the prescribed time duration and from which astable interval a return to the stable interval occurs at the end of the prescribed time duration;
B. the timer provides
1. a disabling signal to the control gates during the astable interval
2. and an enabling signal to the control gates during the stable interval;
C. and, the control gates are respectively enabled and disabled by the respective enabling and disabling signals.

7. The invention defined in claim 6 wherein
A. each control gate includes an input control terminal;
B. the timer comprises a single-shot circuit having an output terminal connected to the input control terminal of each control gate;
C. the single-shot circuit provides on its output terminal
1. an enabling signal potential during its stable interval
2. and a disabling signal potential during its astable interval;
D. and, the comparing means causes the single-shot circuit to change from its stable interval to its astable interval upon the occurrence of a said input transition which changes the input logic level from the same as to different from the output logic level.

8. The invention defined in claim 7 wherein
A. the output device comprises a flip-flop the two input terminals of which are set and clear terminals;
B. each control gate is a two-input NAND gate having an output terminal connected to a different one of the set and clear input terminals of the flip-flop;
C. the output terminal of the single-shot circuit is connected to the input control terminal of each control gate;
D. an inverter gate is provided;
E. the input circuit is connected to the second input of one control gate;
F. and, the inverter gate is connected in series between the input circuit and the second input of the other control gate.

9. The invention defined in claim 8 wherein
A. the output flip-flop is provided with two output terminals connected to the output circuit;
B. the respective output terminals of the flip-flop apply to the output circuit at the same time respective ones of the two output signal logic levels depending upon the then existing state of the flip-flop;
C. the single-shot circuit is provided with two input terminals selectively energizable in a particular manner to cause the single-shot circuit to change from its stable interval to its astable interval;
D. the comparing means compares the signal levels on the second inputs of the control gates with the signal levels on the two output terminals of the flip-flop;
E. and, the comparing means selectively energizes the two inputs of the single-shot circuit in the particular manner whenever the signal levels on the second inputs of the control gates and on the two output terminals of the flip-flop are such as to indicate the occurrence of a said input transition which changes the input logic level from the same as to different from the output logic level.

10. The invention defined in claim 9 wherein the comparing means comprises a pair of comparing gates,
A. each comparing gate comprising a two-input NAND gate having an output terminal connected to a different one of the two input terminals of the single-shot circuit,
B. the two inputs of one comparing gate being respectively connected to one of the flip-flop output terminals and to the second input of said one control gate,
C. and the two inputs of the other comparing gate being respectively connected to the other of the flip-flop output terminals and to the second input of said other control gate.

11. The invention defined in claim 10 wherein
A. each control gate provides at its output terminal a prescribed energizing potential independent of input signal logic level whenever disabling potential is provided at the input control terminal of the control gate;
B. each control gate provides at its output terminal a variable energizing potential controlled by and according to the input signal logic level whenever enabling potential is provided at the input control terminal of the control gate;
C. and, each control gate includes a time delay characteristic for delaying on the control gate output terminal any change from the prescribed potential to another potential.

12. A pulse repeater for receiving and for transmitting pulse signals consisting of two logic levels of signal and abrupt between-level signal transitions comprising
A. an input circuit for receiving pulse signals;
B. a two-state output device settable into either state and from either state to the other state;
C. an output circuit controlled by the output device to transmit pulse signals consisting of
1. two logic levels of signal corresponding to the two states of the output device
2. and abrupt between-level signal transitions corresponding to the setting of the output device from either state to the other state;
D. an enable-disable control gate circuit;
E. means interconnecting the control gate circuit with the input circuit and with the output device
1. so that the output device is set according to the input signal logic level whenever the control gate circuit is enabled
2. and so that the output device is prevented from being set according to the input signal logic level whenever the control gate circuit is disabled;
F. means for comparing the input signal with the output signal;
G. and, timing means controlled by the comparing means
1. to disable the control gate circuit for a prescribed time duration starting upon the occurrence of an input transition which changes the input logic level from the same as to different from the output logic level
2. and to enable the control gate circuit at all other times.

* * * * *